(12) United States Patent
Uchiyama et al.

(10) Patent No.: US 7,462,025 B2
(45) Date of Patent: Dec. 9, 2008

(54) CONTROLLER FOR INJECTION MOLDING MACHINE

(75) Inventors: Tatsuhiro Uchiyama, Gotenba (JP);
Osamu Saito, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 243 days.

(21) Appl. No.: 11/436,765

(22) Filed: May 19, 2006

(65) Prior Publication Data

US 2006/0276927 A1 Dec. 7, 2006

(30) Foreign Application Priority Data

Jun. 2, 2005 (JP) .............................. 2005-162534

(51) Int. Cl.
*B29C 45/77* (2006.01)
(52) U.S. Cl. ...................... 425/143; 425/145
(58) Field of Classification Search ................ 425/143, 425/145
See application file for complete search history.

(56) References Cited

U.S. PATENT DOCUMENTS

| 5,030,395 A | | 7/1991 | Kamiguchi |
| 5,620,646 A | * | 4/1997 | Sparer et al. ................ 425/143 |
| 7,313,967 B2 | * | 1/2008 | Uchiyama et al. ............. 73/714 |

FOREIGN PATENT DOCUMENTS

| EP | 0364599 | 4/1990 |
| JP | 59-224324 | 12/1984 |
| JP | 01226319 | 9/1989 |
| JP | 01228821 | 9/1989 |
| JP | 1228821 | 9/1989 |
| JP | 01288419 | 11/1989 |
| JP | 04-329113 | 11/1992 |
| JP | 5057773 | 3/1993 |
| JP | 08-281729 | 10/1996 |
| JP | 09-220740 | 8/1997 |
| JP | 11-188763 | 7/1999 |
| JP | 2001252957 | 9/2001 |
| JP | 2002028960 | 1/2002 |
| JP | 2003-326573 | 11/2003 |

OTHER PUBLICATIONS

Notice of Reasons for Rejection (Office Action) in corresponding Japanese Patent Application No. 2005-162534, mailed Jul. 24, 2007.
European Search Report dated Sep. 22, 2006 for related European Patent Application No. 06 25 2246.

* cited by examiner

*Primary Examiner*—Tim Heitbrink
(74) *Attorney, Agent, or Firm*—Staas & Halsey LLP

(57) ABSTRACT

There is provided the torque limiter for limiting a torque command to be output when pressure feedback control of the pressure holding step is performed. After the start of the pressure holding step, the torque limiter limits output torque of the servomotor for injection for a predetermined time period after the screw starts to move backward. As a result, the output torque in the backward direction of the screw is limited and reduced, whereby the speed of backward movement of the screw is reduced, and decrease of the pressure applied to the resin becomes moderate, thus abrupt drop of the pressure can be avoided.

4 Claims, 7 Drawing Sheets

CONTROLLER FOR INJECTION MOLDING MACHINE

BACKGROUND OF THE INVENTION

1. Field of the Invention

The present invention relates to a controller for injection molding machine. Particularly the present invention relates to a controller characterized in pressure hold control.

2. Description of the Related Art

In injection molding, an injection step for injecting molten resin to fill a mold cavity is carried out, and thereafter a pressure holding step for holding the filled resin at predetermined pressure is executed. Injection speed control is generally performed in the injection step, and pressure control is performed in the pressure holding step.

In the pressure holding step, the screw is caused to move backward by controlling the pressure by means of holding pressure which is lower than the pressure on the resin at the time of completion of the injection step, to perform control so as to obtain the set holding pressure. A significant change in pressure occurs immediately after switching from the speed control in the injection step to the pressure control in the pressure holding step, thus a sink mark, short shot, or other molding failure occurs. For this reason, there have been known a method of suppressing the occurrence of sink marks and the like by limiting the speed of backward movement of the screw in the pressure holding step (see Japanese Patent Application Laid-Open No. 2003-326573 (referred to as "Patent Literature 1" hereinafter)), and a method of controlling the torque of a motor driving the screw on the basis of a limiting value of the speed of backward movement of the screw and the speed of backward movement of the screw, and performing control so that bubbles are not generated inside the resin when switching from the injection step to the pressure holding step (see Japanese Patent Application Laid-Open No. 9-220740 (referred to as "Patent Literature 2" hereinafter)).

When switching from the injection step to the pressure holding step, switching of the screw moving direction from the forward direction (injection direction) in the injection step to the backward direction becomes difficult due to the effect of inertia force of the screw or the like, thereby causing overfilling of resin and deteriorating the quality of molded articles. For this reason, there has been also known a method of performing control so as to prevent such overfilling of resin by generating maximum torque on an injection motor in the braking direction (backward direction) until speed for limiting the holding pressure is reached or for a predetermined period of time, and stopping the forward movement of the screw rapidly, when switching from the injection step to the pressure holding step (see Japanese Patent Application Laid-Open No. 4-329113 (referred to as "Patent Literature 3" hereinafter) and Japanese Patent Application Laid-Open No. 8-281729 (referred to as "Patent Literature 4" hereinafter)).

There has been also known a method in which, in order to avoid the influence of the inertia energy by stopping forward movement of the screw rapidly, low speed at which the inertia energy of the injection screw or the like can be disregarded is set in the injection step when switching to the pressure holding step, so that the injection step where speed control is performed can be shifted to the pressure holding step where pressure control is performed, without being affected by the inertia energy when switching from the injection step to the pressure holding step (see Japanese Patent Application Laid-Open No. 59-224324 (referred to as "Patent Literature 5" hereinafter)).

Also, there has been known a method in which the speed of forward movement of a plunger is reduced at a set acceleration until the pressure inside the cylinder reaches commanded pressure, when the step has shifted from the injection step to the pressure holding step, and thereafter control for holding the commanded pressure is performed (see Japanese Patent Application Laid-Open No. 11-188763 (referred to as "Patent Literature 6" hereinafter)).

According to the methods described in Patent Literatures 3 through 6 above, the amount of forward movement of the screw is reduced when shifting from the injection step to the pressure holding step in accordance with the inertia energy of the screw or the like. Furthermore, in the methods described in Patent Literatures 1 and 2 above, the occurrence of sink marks or bubbles is prevented by limiting the speed of backward movement of the screw when the screw starts to move in a backward direction from a forward direction when the injection step is shifted to the pressure holding step, so that abrupt reduction of the pressure after the screw has started the backward movement can be suppressed. However, the pressure which has dropped immediately after starting to hold the pressure cannot be controlled, thus the object of preventing the occurrence of sink marks or bubbles cannot be achieved sufficiently.

FIG. 8 is a figure showing the relationship among the speed of a screw, torque of an injection motor driving the screw, and the pressure applied to a resin when applying control for limiting the speed of backward movement of the screw after switching the step to the pressure holding step. In FIG. 8, (a) shows the speed of the screw, (b) shows output torque of the injection motor driving the screw, and (c) shows the pressure applied to the resin.

In the injection step, the screw is driven at a set injection speed, as shown in (a) of FIG. 8. In the meantime the resin is filled into a mold cavity, and the pressure applied to the resin (injection pressure) rises, as shown in (c) of FIG. 8. When a switching point (point at time t1) at which the injection step is switched to the pressure holding step is reached, the control performed in the injection step is switched to pressure control, and, as shown in (b) of FIG. 8, the injection motor generates maximum torque in an opposite direction (direction for causing the screw to move backward), trying to stop the forward movement of the screw. It should be noted that the moving speed and torque of the screw in the forward direction are referred to as "positive speed" and "positive torque," and the moving speed and torque of the screw in the backward direction are referred to as "negative speed" and "negative torque" hereinafter. The screw moves forward by means of the inertia energy even if the injection motor generates maximum negative torque (the methods described in Patent Literatures 3 through 6 reduce the amount of this forward movement), and the pressure applied to the resin increases during the forward movement, as shown in (c) of FIG. 8.

When the speed becomes a negative value from a positive value at time t2 and the screw starts to move backward, the pressure applied to the resin starts to decrease as shown in (c) of FIG. 8. At this moment, when no limits are placed on the speed of the backward movement of the screw, the speed of the backward movement of the screw is large, thus the pressure (holding pressure) indicated with the solid line in (c) of FIG. 8, described with "before limiting the speed", is applied to the resin, and the pressure decreases abruptly. As in the methods described in Patent Literatures 1 and 2 above, on the other hand, if control is performed with a limiting value provided to the speed of the backward movement of the screw (see (a) of FIG. 8), the speed of the backward movement of the screw is limited, thus the pressure (holding pressure) applied to the resin decreases moderately as shown in the graph indicated with the dashed line in (c) of FIG. 8, described with "after limiting the speed", so that the pressure can be prevented from being reduced abruptly and the occurrence of sink marks or bubbles can be suppressed.

However, as shown in FIG. 8, since the forward movement of the screw is switched to the backward movement to allow the screw to start moving backward, until the speed of the backward movement reaches a set limiting value of the speed of the backward movement, any kind of control is not performed, thus the pressure applied to the resin decreases drastically. Specifically, between the time t2 and time t3 in FIG. 8, the pressure applied to the resin decreases drastically (see (c) of FIG. 8) and control is not performed on the pressure. Therefore, such drastic decrease of the pressure during the above time becomes a cause of the occurrence of sink marks of bubbles, deteriorating the quality of molded articles.

SUMMARY OF THE INVENTION

The present invention relates to a controller for an injection molding machine which performs control of pressure in the pressure holding step by pressure feedback control.

A first aspect of the controller for an injection molding machine according to the present invention comprises: torque limiting value setting means for setting, every elapsed time after the start of the pressure holding step, a torque limiting value in a direction opposite to a forward direction of a screw at the time of injection; and means for limiting the torque every elapsed time in accordance with the elapsed time and the torque limiting value which are set in the torque limiting value setting means.

The torque limiting value in the opposite direction may be set to maximum torque before the speed of forward movement of the screw reaches zero after the start of pressure holding, and the torque limiting value in the opposite direction may be set every elapsed time after the speed of forward movement of the screw reaches zero, by the torque limiting value setting means.

The torque limiting value to be set every elapsed time may be set in shapes of a plurality of patterns beforehand by means of the torque limiting value setting means, and the set plurality of patterns may be stored in storage means so that any pattern is selectively taken out from the storage means.

A set value for the torque limiting value to be set every elapsed time and actual torque may be displayed on a screen. A second aspect of the controller for an injection molding machine according to the present invention comprises: means for setting a torque limiting value in a direction opposite to a forward direction of a screw, a time period in which torque is limited using the torque limiting value, and moving speed of the screw at which torque limitation is started; means for detecting the moving speed of the screw; and means for limiting, when the speed detected in the screw moving speed detection means becomes a set value, the torque to the set torque limiting value for the set time period.

According to the present invention, at the time of the start of pressure holding, torque in a direction where the screw is caused to move backward is limited and reduced when the screw starts to move backward, whereby the speed of the backward movement of the screw becomes moderate, and abrupt decrease of the pressure applied to the resin can be suppressed, thus the occurrence of sink marks or bubbles can be prevented and the quality of a molded article can be improved.

BRIEF DESCRIPTION OF THE DRAWINGS

The above-described and other objects and characteristics of the present invention are made apparent in the description of the embodiments below with reference to the attached drawings; in which.

DESCRIPTION OF THE PREFERRED EMBODIMENTS

Figure 1:
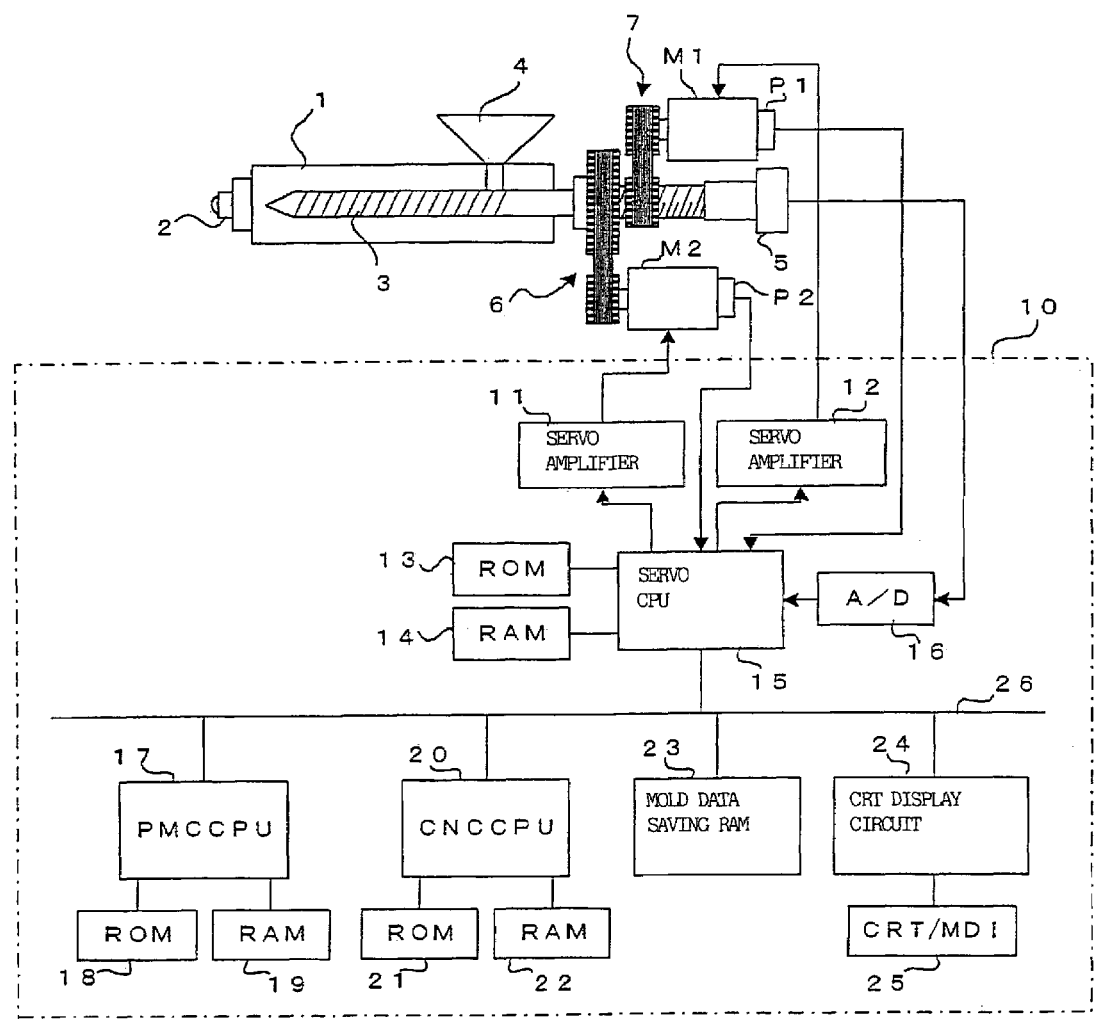
FIG. 1 is a block diagram showing an essential part of an embodiment of the controller for an injection molding machine according to the present invention.

FIG. 1 is a block diagram showing an essential part of an embodiment when applying the present invention to an electric injection molding machine.

A leading end of an injection cylinder 1 of the injection molding machine is attached with a nozzle portion 2. An injection screw 3 is inserted into the injection cylinder 1. The injection screw 3 is provided with a pressure sensor 5 such as a load cell for sensing pressure applied to a resin by means of pressure applied to the injection screw 3. The injection screw 3 is rotated by a servomotor for screw rotation M2 via driving means 6 configured wit a pulley, belt, and the like. The injection screw 3 is driven by a servomotor M1 for injection via driving means 7 comprising a mechanism for switching rotary motion of a pulley, belt, ball screw/nut mechanisms to linear motion, and is moved in a direction of the axis of the injection screw 3. A reference numeral P1 denotes a position/speed detector for detecting the position and speed of the injection screw 3 in the axial direction by detecting the position or speed of the servomotor M1. A reference numeral P2 denotes a position/speed detector for detecting the rotational position and rotation speed of the injection screw 3 by detecting the position or speed of the servomotor M2. Further, a reference numeral 4 denotes a hopper for supplying a resin to the injection cylinder 1.

A controller 10 for the injection molding machine of the present invention has a CNC-CPU 20 which is a microprocessor for performing numerical control, a PMC-CPU 17 which is a microprocessor for a programmable machine controller, and a servo CPU 15 which is a microprocessor for performing servo control, wherein transmission of information can be carried out among the microprocessors by selecting mutual input/output via a bus 26.

The servo CPU 15 is connected to a ROM 13 storing a control program exclusively for servo control for controlling the servomotors for the individual axes, including pressure feedback control executed during the pressure holding step, and to a RAM 14 which is used for temporarily storing data. Further, the servo CPU 15 is connected so as to be able to detect, via an A/D (analog/digital) converter 16, a pressure signal sent from the pressure sensor 5 provided on the injection molding machine main body side.

Moreover, servo amplifiers 12, 11, which drive, on the basis of a command from the servo CPU 15, the servomotor M1 for injection which is connected to an injection axis and the servomotor M2 for screw rotation which is connected to a screw rotation axis, are connected to the servo CPU 15, and outputs from the position/speed detectors P1, P2 attached to the servomotors M1, M2 respectively are fed back to the servo CPU 15. The rotational positions of the servomotors M1, M2 are computed by the servo CPU 15 on the basis of feedback signals of the positions sent from the position/speed detectors P1, P2, and are updated and stored in current position storage registers respectively. FIG. 1 shows only the servomotors M1, M2 for respectively driving the injection axis and screw rotation axis, the position/speed detectors P1, P2 for detecting the rotational positions and rotational speeds of the servomotors M1, M2, and the servo amplifiers 12, 11. However, configurations of axes such as a mold clamping axis for performing mold clamping and an ejector axis for removing a molded article from the mold cavity are all the same as the configurations of the axes described above, thus the illustrations thereof are omitted in FIG. 1.

The PMC-CPU 17 is connected to a ROM 18 storing a sequence program or the like for controlling sequence operation of the injection molding machine, and to a RAM 19 used for temporarily storing computation data. The CNC-CPU 20 is connected to a ROM 21 storing an automatic operation program or the like for entirely controlling the injection molding machine, and to a RAM 22 used for temporarily storing computation data.

A mold data saving RAM23, which is configured with nonvolatile memory, is a memory for storing molding conditions, various set values, parameters, macro variables, and the like related to an injection molding work. A manual data input device with CRT 25 is connected to a bus 26 via a CRT display circuit 24, and can select a graph display screen or function menu and perform setting, input operation and the like of various data. Particularly, in connection with the present invention, the manual data input device with CRT 25 inputs and sets the torque limiting value pattern, and thus is provided with a numerical keypad for inputting numerical data and various function keys. It should be noted that a liquid crystal display may be used as a display device.

With the configuration described above, the PMC-CPU 17 controls sequence operation of the entire injection molding machine, the CNC-CPU 20 distributes move commands to servomotors for the individual axes on the basis of an operating program of the ROM 21 and the molding conditions stored in the mold data saving RAM23. Further, the servo CPU 15 performs, as in the prior art, servo control such as control of position loops, control of speed loops, and control of current loops, on the basis of the move commands distributed to the individual axes, and the feedback signals of the position and speeds detected by the position/speed detectors P1, P2, and further performs pressure feedback control during the pressure holding step by means of the actual pressure applied on the resin, which is fed back by the pressure sensor 5, to drive-control the servomotors M1, M2, in connection with the present invention.

The configuration described above is same as a controller for a conventional electric injection molding machine. The differences with the prior art are that the torque limiting value pattern for limiting a torque command value (current command value) is set beforehand and stored in the mold data saving RAM23 during the pressure holding step, and that the torque limiting value at the time is read from the stored torque limiting value pattern and output to the servo CPU 15 during the pressure holding step, and the servo CPU 15 limits a torque command which is output to the servomotor M1 for injection, by means of this torque limiting value.

Figure 2:
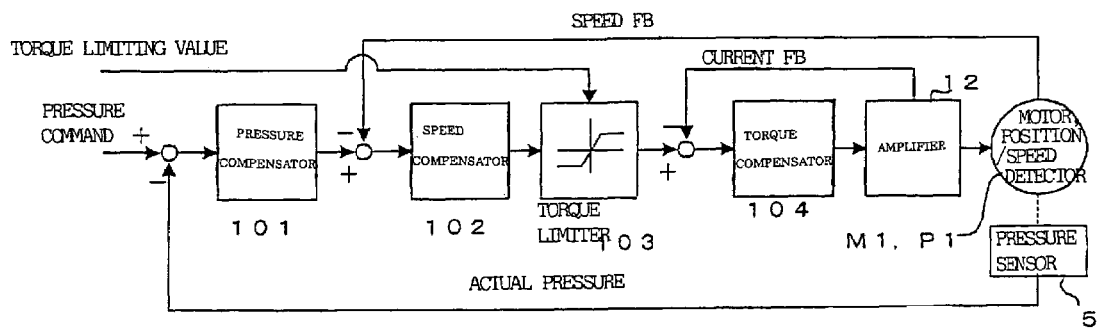
FIG. 2 is a block diagram showing a first example of control which is carried out by a servo CPU of the controller of FIG. 1 during the pressure holding step.

FIG. 2 is a block diagram showing a first example of control which is carried out by the servo CPU 15 during the pressure holding step.

In the pressure holding step, the servo CPU 15 executes the processing shown in FIG. 2 every predetermined cycle, obtains, when a pressure command based on the set holding pressure is output from the CNC-CPU 20, a pressure deviation by subtracting the fed back actual pressure applied to the resin, which is sensed by the pressure sensor 5, from the pressure command, and performs pressure compensation processing by means of a pressure compensator 101 on the basis of the obtained pressure deviation to obtain a speed command corresponding to the pressure deviation. Thereafter, the servo CPU 15 obtains a speed deviation by subtracting, from the speed command, a speed feedback value obtained from the position/speed detector P1, and performs speed compensation processing by means of a speed compensator 102 on the basis of the obtained speed deviation, to obtain a torque command. The servo CPU 15 then inputs the torque command to a torque limiter 103.

If the input torque command exceeds a torque limiting value set in the torque limiter 103, the torque limiting value is output as the torque command. On the other hand, if the input torque command does not exceed the torque limiting value, the torque command output from the speed compensator 102 is directly output as the torque command. The difference between this torque command (electric current command) and current which is detected by, and fed back from, a current detector (not shown) provided in the servo amplifier 12 is processed by a torque compensator 104 to obtain a voltage command for the motor, and drive of the servomotor M1 for injection is controlled via the servo amplifier 12.

Pressure feedback control in the pressure step shown in FIG. 2 is different from pressure feed back control in the pressure holding step of the prior art, in terms of that, in the former pressure feedback control, the torque limiter 103 is provided so as to perform torque control on the torque command which moves the screw in the opposite direction (negative direction).

Figure 3:
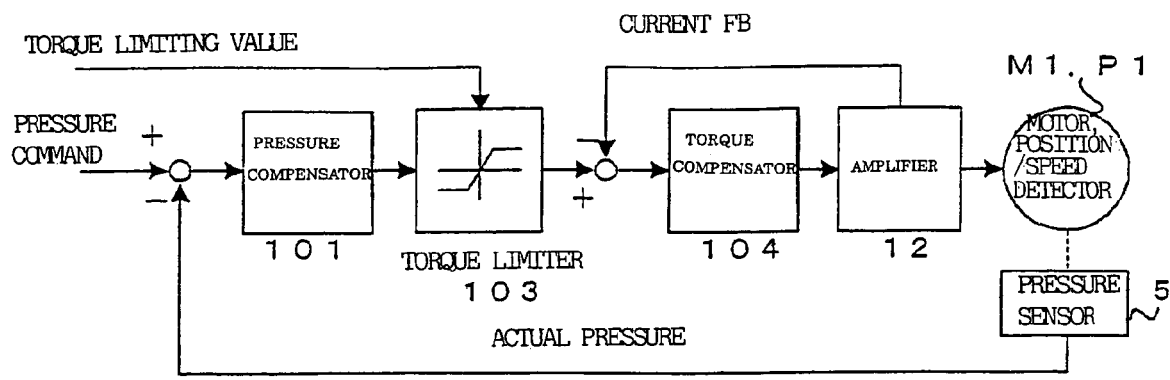
FIG. 3 is a block diagram showing a second example of control which is carried out by the servo CPU of the controller of FIG. 1 during the pressure holding step.

FIG. 3 is a block diagram showing a second example of control which is carried out by the servo CPU 15 during the pressure holding step. The difference with the first example shown in FIG. 2 is that in the second example the speed compensator 102 is not provided, thus the pressure compensator 101 obtains the torque command. The rest is same as the first example shown in FIG. 2.

Next, operation of pressure feedback control in the pressure holding step of each of the examples is described with reference to FIG. 4.

Figure 4:
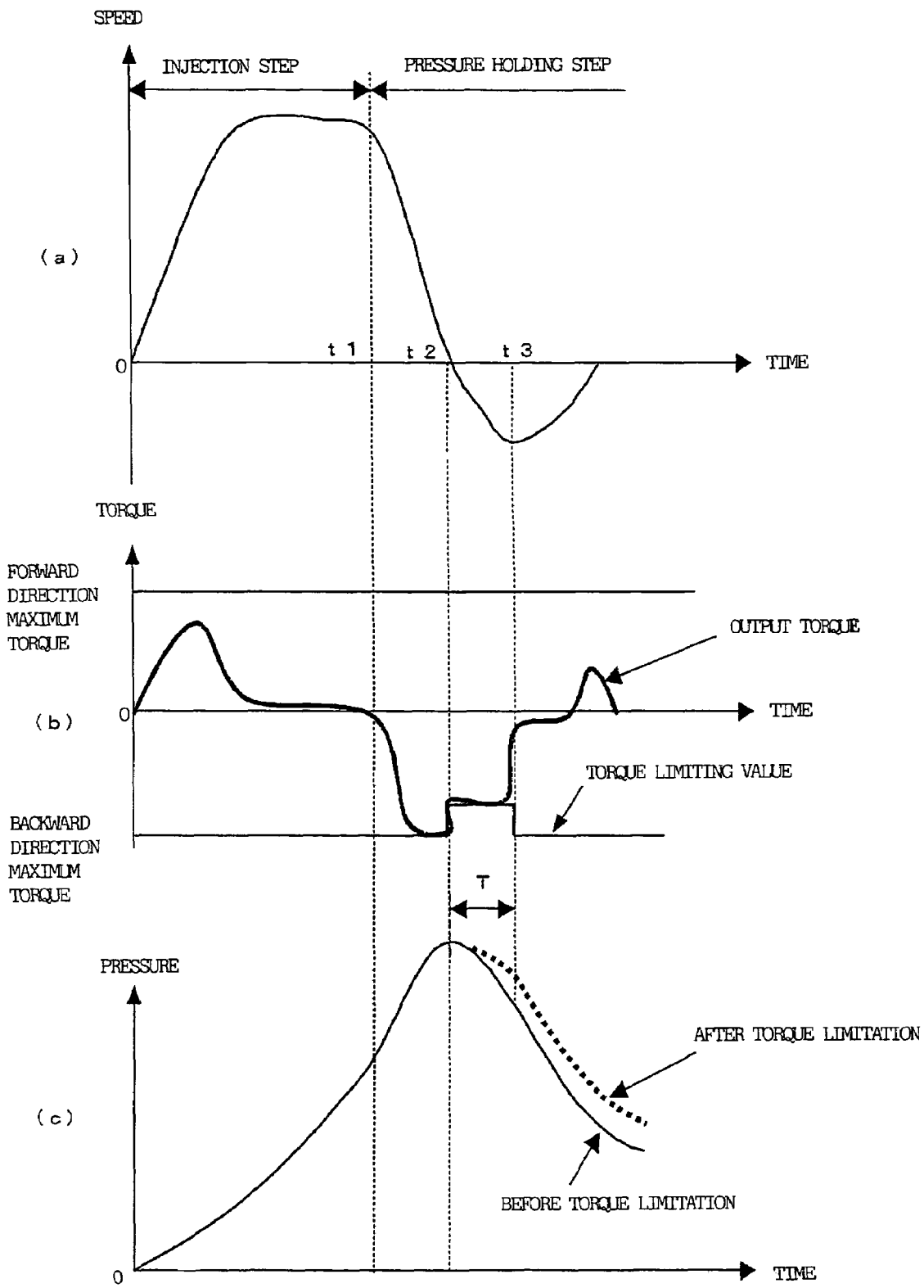
FIG. 4 is a graph showing the relationship among screw speed (a), output torque of a servomotor for injection (b), and pressure applied to a resin (c) in an injection step and the subsequent pressure holding step when the controller of FIG. 1 carries out pressure feedback control.

FIG. 4 shows the relationship among screw speed, output torque of the servomotor for injection, and pressure applied to the resin in the injection step and pressure holding step in the present embodiment, wherein (a) shows the screw speed, (b) shows the output torque of the servomotor M1 for injection, and (c) shows the pressure applied to the resin (pressure sensed by the pressure sensor 5). As the torque limiting value pattern when switching the step to the pressure holding step, as shown in (b) of FIG. 4, a torque limiting value in the negative direction (backward direction of the screw) is the maximum torque (that is, no torque limitation is put) from the time t1 for switching from the injection step to the pressure holding step until the time t2 at which the speed of forward movement of the screw becomes approximately zero, and the torque limiting value in the negative direction (backward direction) is approximately 70% of the maximum value, in a predetermined time period T starting from the time t2. Thereafter, the torque limiting value pattern as the maximum torque (no torque limitation is put) is set in the mold data saving RAM23, read, and stored in the RAM 22.

In the injection step, the speed of the screw, i.e. the injection speed, is controlled as shown in (a) of FIG. 4, and the output torque of the servomotor M1 for injection is changed to obtain this injection speed, as shown in (b) of FIG. 4. The pressure applied to the resin (actual pressure sensed by the pressure sensor 5) sequentially increases since the resin is filled into the mold cavity as injection proceeds, as shown in (c) of FIG. 4. When the switching point (t1) at which the injection step is switched to the pressure holding step is reached, pressure control is performed, and pressure feedback control shown in FIG. 2 and FIG. 3 is started. The CNC-CPU 20 reads the pressure command and the torque limiting pattern, and outputs to the torque limiter 103 the torque limiting value of the current cycle since the start of the pressure holding step.

As shown in (c) of FIG. 4, when shifting the step from the injection step to the pressure holding step, the pressure detected by the pressure sensor 5 is large. However, the pressure command in the pressure holding step is lower than the resin pressure at the time of switching to the pressure holding step. Therefore, the pressure deviation (pressure command value−detected pressure value) becomes a negative value, and the value output from the pressure compensator 101 becomes a negative value. In pressure feedback control in the example shown in FIG. 2, the speed feedback value is subtracted from the value output from the pressure compensator 101. However, immediately after switching the pressure holding step, the screw moves forward and the speed feedback value is positive, as shown in (a) of FIG. 4. Therefore, the positive speed feedback value is subtracted from the negative value output from the pressure compensator 101, whereby the negative value becomes larger, which is then input to the speed compensator 102, with the result that the torque command output from the speed compensator 102 becomes a large negative value. However, the torque limiter 103 takes the maximum torque until the time t2 as the limiting value (i.e. no torque limitation is put), thus the torque command increases to negative maximum torque (without being limited), the output torque of the servomotor M1 for injection reaches the negative maximum torque as shown in (b) of FIG. 4, and the speed of the screw is reduced rapidly.

In pressure feedback control in the example shown in FIG. 3 as well, the large negative value output from the pressure compensator 101 is input to the torque limiter 103. However, since the toque limiting value of the torque limiter 103 is the maximum torque, a large negative torque command is output, the output torque of the servomotor M1 for injection reaches the negative maximum torque (without being limited) as shown in (b) of FIG. 4, and the speed of the screw is reduced rapidly.

When reaching the time t2 at which the speed of the screw reaches zero and the direction of the screw is switched to the negative direction, a reduced torque limiting value in the negative direction (for example, a torque limiting value in the negative direction which is approximately 70% of the maximum torque) is output from the CNC-CPU 20 to the torque limiter 103, and the torque command is limited to this limiting value. As a result, the negative output torque of the servomotor M1 for injection becomes a limited value as shown in (b) of FIG. 4.

Figure 8:
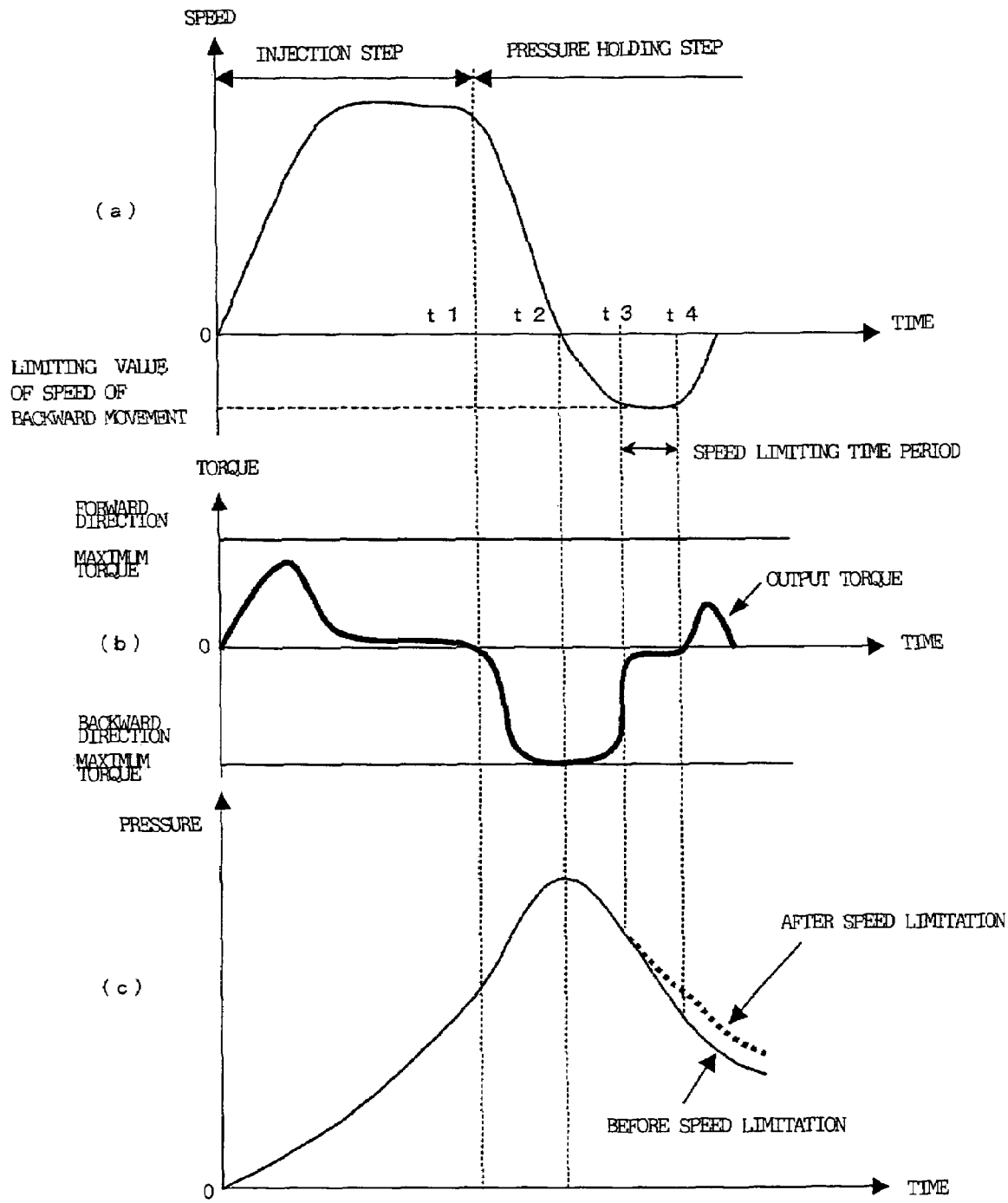
FIG. 8 is a graph showing the relationship among screw speed when the speed of backward movement of the screw is limited (a), output torque of the servomotor for injection (b), and pressure applied to the resin (c) after switching from the injection step to the pressure holding step in the prior art.

The negative output torque of the servomotor for injection M1 is limited and becomes smaller than the maximum torque, thus the moving speed of the screw which is already moving in the backward direction (negative direction) becomes slower than when being limited. As a result, abrupt decrease of the resin pressure can be suppressed. In (c) of FIG. 4, the dashed line shows the pressure applied to the resin (pressure sensed by the pressure sensor 5) when torque limitation is put in the backward direction (negative direction), and the solid line shows a case in which torque limitation is not put (the limiting value in the backward direction is the maximum torque) during the time t2. As shown in (c) of FIG. 4, when control is switched to pressure control of the pressure holding step and the screw starts to move backward, the speed of backward movement of the screw is reduced to moderate the reduction of the pressure applied to the resin, by making the torque limiting value in the backward direction lower than the maximum torque value. As compared with the conventional method shown in FIG. 8 where the speed of backward movement of the screw is limited, in the case of the present embodiment, the reduction of the pressure in a time period from the time t2 to the time t3, which is immediately after the screw starts to move backward, is moderate, as shown in (c) of FIG. 4, while in the conventional method, the pressure applied to the resin decreases abruptly between the time t2 and the time t3, which is immediately after the screw starts to move backward, as shown in (c) of FIG. 8. This time period which makes moderate the decrease of the pressure is provided by setting an optimum length of the time period T. Accordingly, the occurrence of sink marks or bubbles can be prevented.

Figure 5:
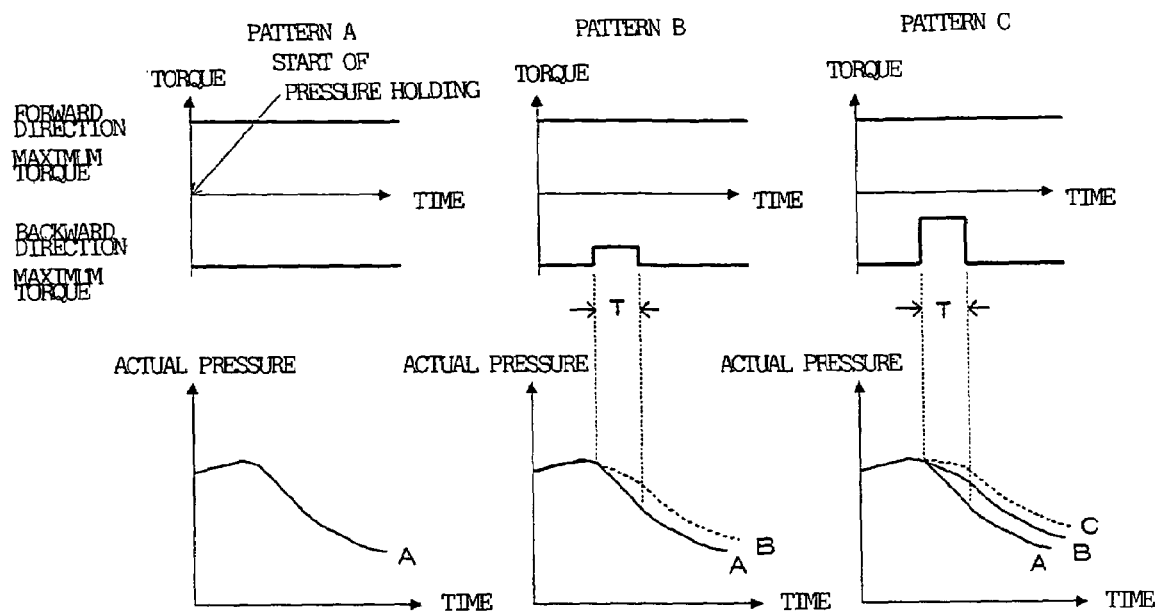
FIG. 5 is a figure showing an example of a torque limiting value pattern after starting the pressure holding step and actual pressure when performing control with the torque limiting value pattern.

FIG. 5 shows an example of the torque limiting value pattern after starting the pressure holding step, which is set in the controller 10, and the actual pressure (pressure applied to the resin, which is sensed by the pressure sensor 5) when performing control with the torque limiting value pattern, wherein, for comparison, pattern A shows an example in which the torque limiting value is 100% and taken as a maximum torque. Pattern B shows an example in which the torque limiting value in the backward direction is approximately 70% of the maximum torque only in the predetermined time period T, and pattern C shows an example in which the torque limiting value in the backward direction is approximately 30% of the maximum torque in the same time period T.

For the actual pressure, decrease of the pressure immediately after the start of the pressure holding step is more moderate in pattern B than in pattern A. Furthermore, decrease of the pressure is more moderate in pattern C than in pattern B. Therefore, by selecting and setting an optimum torque limiting pattern of the backward direction, a high-quality molded article with no sink marks or bubbles can be molded.

In the above embodiment, the torque limiting value pattern at the time when the screw moves backward is changed in stages, the torque limiting value pattern may be a torque limiting value pattern with an inclined profile such as a line graph, or may be a torque limiting value pattern with a curved profile. In either case, it is only necessary to set a torque limiting pattern such that the output torque of the servomotor M1 for injection is limited from when the screw starts to move backward, to allow the CNC-CPU 20 to read this torque limiting value pattern, to output a torque limiting value corresponding to the present cycle to the servo CPU 15, and to execute pressure feedback control including limitation of the torque command, as shown in FIG. 2 and FIG. 3.

Figure 6:
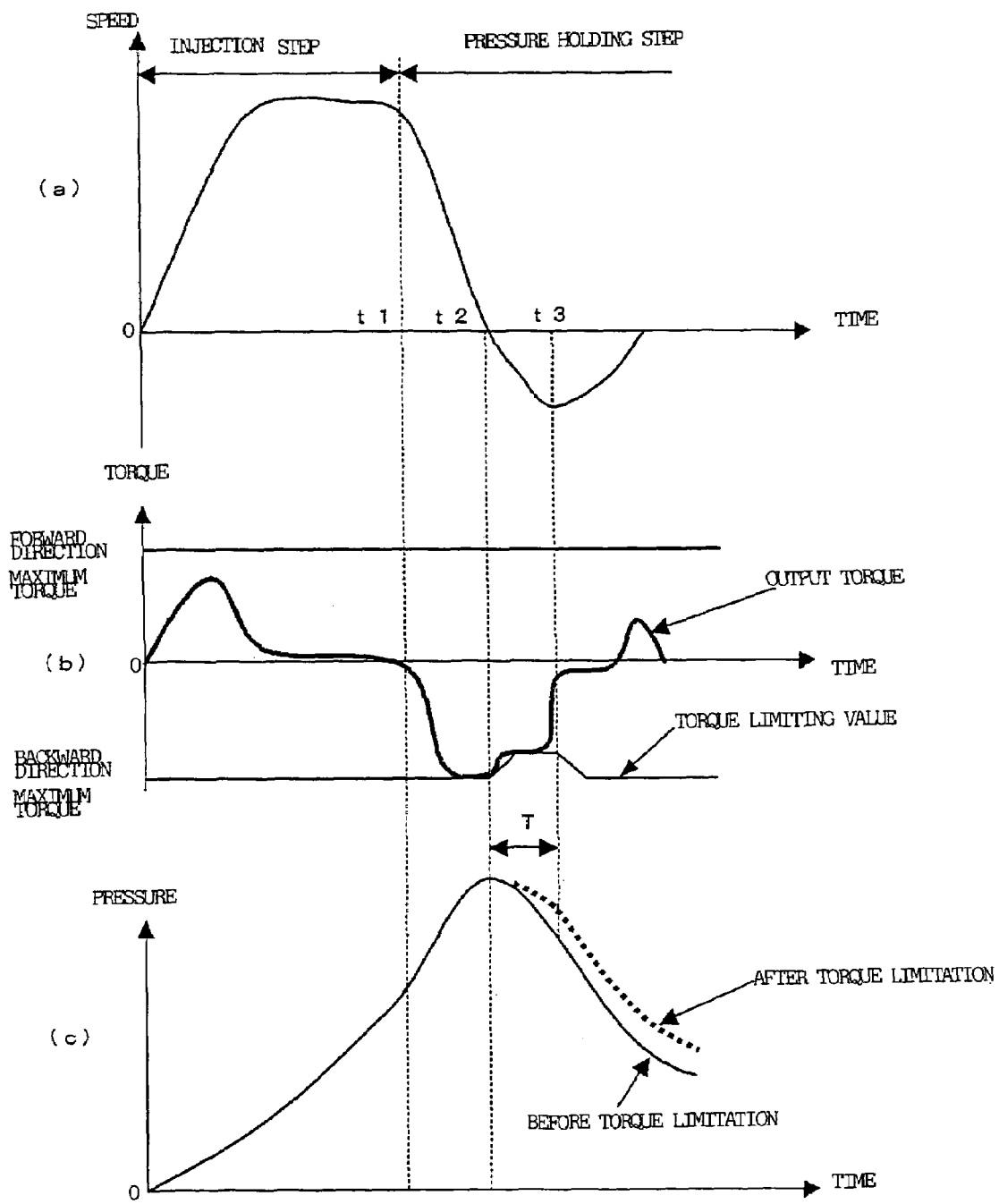
FIG. 6 is a graph showing the relationship among screw speed in the injection step and the subsequent pressure holding step (a), output torque of the servomotor for injection (b), and pressure applied to the resin (c) in a case in which the torque limiting value pattern after starting the pressure holding step is set so that the profile thereof is inclined.

FIG. 6 is a figure showing an operational state when the torque limiting value pattern is set so that the profile thereof is inclined such as a line graph, wherein a pattern is set in which, after the start of the pressure holding step, the negative torque limiting value decreases with inclination and reaches a predetermined value after around the time t2 at which the screw starts to move backward, and inclines to increase to a maximum torque after the time t3 which is after an elapse of the predetermined time period T since the time t2. Through torque limitation with this torque limiting value pattern as well, the torque limiting value in the negative direction (backward direction of the screw) becomes smaller when the screw starts to move backward, thus decrease of the pressure applied to the resin becomes moderate as shown in (c) of FIG. 6, whereby abrupt decrease of the pressure is prevented.

Figure 7:
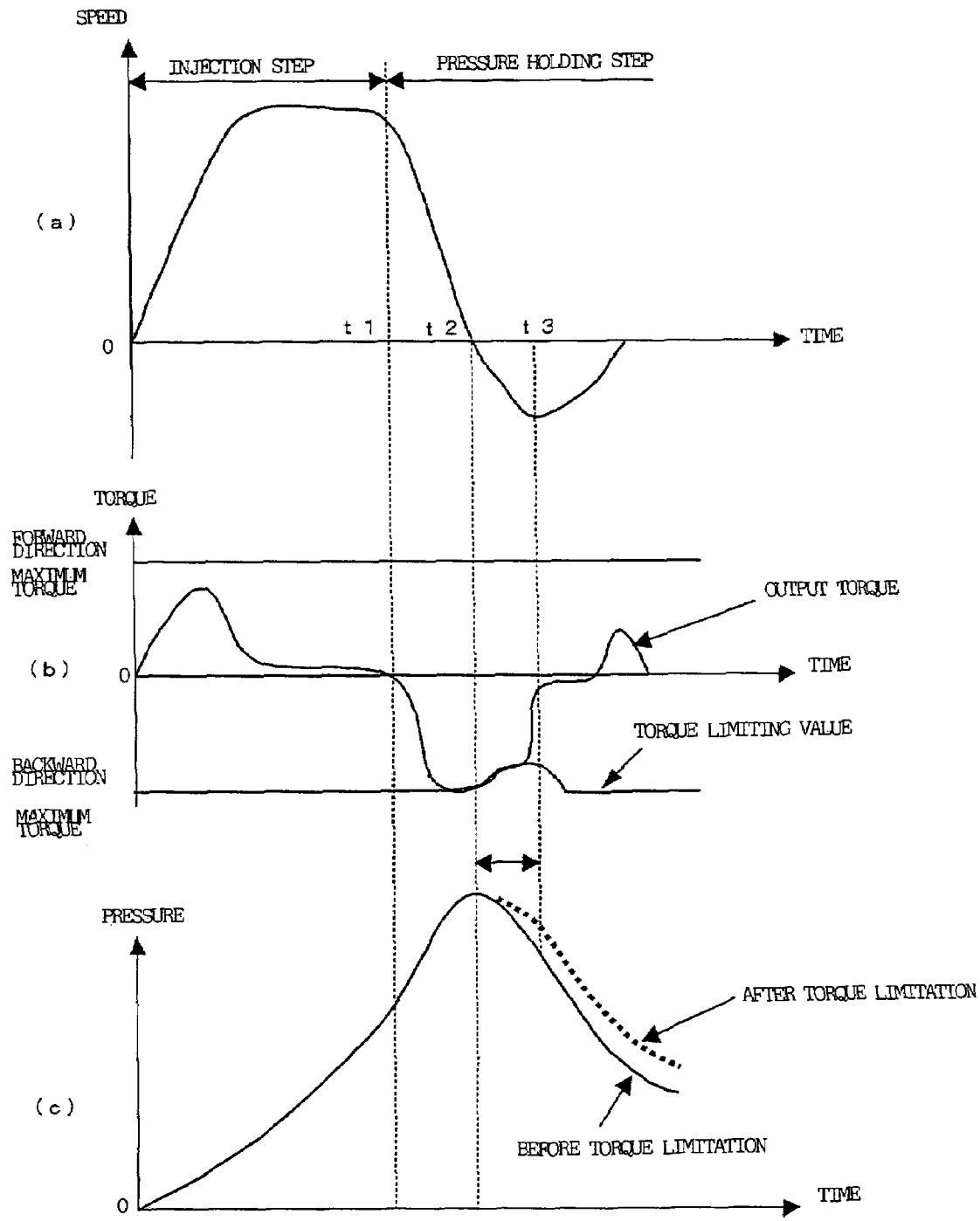
FIG. 7 is a graph showing the relationship among screw speed in the injection step and the subsequent pressure holding step (a), output torque of the servomotor for injection (b), and pressure applied to the resin (c) in a case in which the torque limiting value pattern after starting the pressure holding step is set so that the profile thereof is curved.

FIG. 7 shows an operational state when the torque limiting value pattern is set so that the profile thereof is curved, wherein a pattern is set in which, after the start of the pressure holding step, the negative torque limiting value decreases in a curved form and reaches a predetermined value after around the time t2 at which the screw starts to move backward, and increases in a curved form to the maximum torque after the time t3 which is after an elapse of the predetermined time period T since the time t2. Through torque limitation with this torque limiting value pattern as well, the torque limiting value in the negative direction (backward direction of the screw) becomes smaller when the screw starts to move backward, thus decrease of the pressure applied to the resin becomes moderate as shown in (c) of FIG. 7, whereby abrupt decrease of the pressure is prevented.

Setting the torque limiting value pattern can be performed by inputting this pattern by means of the manual data input device with CRT 25. For example, the torque limiting value may be set at every cycle in which the CNC-CPU 20 outputs a commend to the servo CPU 15 after the start of the pressure holing step, to set the staged patterns as shown in FIG. 4 and FIG. 5, the pattern with inclined profiles as shown in FIG. 6, and the pattern with curved profiles as shown in FIG. 7. Moreover, when setting various torque limiting value patterns and storing these patterns in the mold data saving RAM 23, the patterns may be displayed on a display of the manual data input device with CRT25 so as to select a pattern. Furthermore, the selected torque limiting value pattern and the actual torque detected by the servo amplifier 12 by performing pressure hold control with this torque limiting value pattern are displayed on the display so that the effect can be checked. The pattern is changed or other torque limiting value pattern is selected according to need.

In addition, in the staged patterns as shown in FIG. 4 and FIG. 5, torque limitation is performed after the screws starts to move backward. Thus, after the speed detected by the position/speed detector P1 attached to the servomotor for injection reaches "0" or approaches the vicinity of the value "0" and the torque limiting value is switched from the maximum torque value to a desired torque limiting value, the predetermined time period T (the number of cycles) for performing desired torque limitation may be set so that the torque limiting value is switched to the maximum torque after the time period T is elapsed.

What is claimed is:

1. A controller for an injection molding machine that performs control of pressure in a pressure holding step by pressure feedback control, the controller comprising:
   torque limiting value setting means for setting, every cycle after the start of the pressure holding step, a torque limiting value in a direction opposite to a forward direction of a screw at the time of injection; and
   means for limiting the torque every cycle in accordance with the torque limiting value which are set in said torque limiting value setting means.

2. The controller for an injection molding machine according to claim 1, wherein the torque limiting value in said opposite direction is set to maximum torque before the speed of forward movement of the screw reaches zero after the start of pressure holding, and the torque limiting value in said opposite direction is set every cycle after the speed of forward movement of the screw reaches zero, by the torque limiting value setting means.

3. The controller for an injection molding machine according to claim 1, wherein the torque limiting value to be set every cycle is set in shapes of a plurality of patterns beforehand by means of the torque limiting value setting means, and the set plurality of patterns are stored in storage means so that any pattern is selectively taken out from the storage means.

4. The controller for an injection molding machine according to claim 1, wherein a set value for the torque limiting value to be set every cycle and actual torque are displayed on a screen.

* * * * *